(12) United States Patent
Kim et al.

(10) Patent No.: US 12,445,992 B2
(45) Date of Patent: Oct. 14, 2025

(54) COMMUNICATION METHOD AND APPARATUS IN WIRELESS COMMUNICATION SYSTEM SUPPORTING EDGE COMPUTING

(71) Applicant: Samsung Electronics Co., Ltd., Suwon-si (KR)

(72) Inventors: Hyesung Kim, Suwon-si (KR); Jicheol Lee, Suwon-si (KR); Cheolung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 431 days.

(21) Appl. No.: 17/959,691

(22) Filed: Oct. 4, 2022

(65) Prior Publication Data

US 2023/0108959 A1    Apr. 6, 2023

(30) Foreign Application Priority Data

Oct. 5, 2021 (KR) .......................... 10-2021-0131849

(51) Int. Cl.
*H04W 60/04* (2009.01)
*H04W 48/14* (2009.01)

(52) U.S. Cl.
CPC ........... *H04W 60/04* (2013.01); *H04W 48/14* (2013.01)

(58) Field of Classification Search
CPC ....... H04W 60/04; H04W 48/14; H04W 8/00; H04W 36/0033; H04W 48/18;
(Continued)

(56) References Cited

U.S. PATENT DOCUMENTS

2018/0249317 A1* 8/2018 Kurasugi .............. H04W 76/22
2021/0352156 A1   11/2021 Kim et al.
(Continued)

FOREIGN PATENT DOCUMENTS

| KR | 10-2021-0136761 A | 11/2021 |
|----|-------------------|---------|
| KR | 10-2022-0001963 A | 1/2022  |
| WO | 2021/060937 A1    | 4/2021  |

OTHER PUBLICATIONS

3GPP TSG-SA WG6 Meeting #41-e;S6-210079; Subclause 8.3, Consistency maintenance; XP 51968733A; Jan. 13, 2021.
(Continued)

*Primary Examiner* — Shawn D Miller
(74) *Attorney, Agent, or Firm* — Jefferson IP Law, LLP

(57) ABSTRACT

A communication method performed by an edge enabler client (EEC) of a user equipment (UE) in a wireless communication system supporting edge computing is provided. The communication method includes receiving, from an application client (AC) executed in the UE, an AC registration request message including an AC profile, an edge configuration server (ECS) address, and user consent on whether to allow external exposure of the AC profile, selecting an ECS for performing service provisioning, based on the AC registration request message, performing a service provisioning procedure for the selected ECS, performing EEC registration and edge application server (EAS) discovery for an edge enabler server (EES) obtained through
(Continued)

the service provisioning procedure, and transmitting EAS information obtained from the EES through the EAS discovery to the AC.

14 Claims, 6 Drawing Sheets

(58) Field of Classification Search
CPC ...... H04W 60/00; H04L 67/30; H04L 67/289; H04L 67/51; H04L 61/4541; H04L 67/148
See application file for complete search history.

(56) References Cited

U.S. PATENT DOCUMENTS

| | | | |
|---|---|---|---|
| 2022/0321673 A1* | 10/2022 | Zaus | H04L 67/562 |
| 2023/0209621 A1* | 6/2023 | Olvera-Hernandez | H04W 76/12 370/329 |

OTHER PUBLICATIONS

3GPP TS 23.558;3rd Generation Partnership Project; Technical Specification Group Services and System Aspects; Architecture for enabling Edge Applications; XP 52000025A; Mar. 16, 2021.

European Search Report dated Nov. 26, 2024, issued in European Application No. 22878809.7.

Qualcomm Technologies, Inc., pCR for Key Issue on EDGE-5, 3GPP TSG-SA WG6 Meeting #45, S6-212103 (revision of S6-211899), Sep. 1, 2021.

International Search Report dated Dec. 14, 2022, cited on an International Application No. PCT/KR2022/014559.

3GPP; TSG SA; Architecture for enabling edge applications; (Release 17) 3GPP TS 23.558 V17.1.0, Sep. 24, 2021.

Samsung; ACR preconditions for EEC; 3GPP TSG-SA WG6 Meeting #45; S6-211974; Aug. 19, 2021.

Convida Wireless LLC; Resolve EN on AC Profile Parameter Ranges IE; 3GPP TSG-SA WG6 Meeting #44; S6-211923; Aug. 19, 2021.

Samsung; EEC context relocation; 3GPP TSG-SA WG6 Meeting #45; S6-211969; Aug. 19, 2021.

* cited by examiner

COMMUNICATION METHOD AND APPARATUS IN WIRELESS COMMUNICATION SYSTEM SUPPORTING EDGE COMPUTING

CROSS-REFERENCE TO RELATED APPLICATION(S)

This application is based on and claims priority under 35 U.S.C. § 119(a) of a Korean patent application number 10-2021-0131849, filed on Oct. 5, 2021, in the Korean Intellectual Property Office, the disclosure of which is incorporated by reference herein in its entirety.

BACKGROUND

1. Field

The disclosure relates to edge computing technology. More particularly, the disclosure relates to a communication method and apparatus in a wireless communication system supporting edge computing.

2. Description of Related Art

In order to meet the demand for wireless data traffic soring since the $4^{th}$ generation (4G) communication system came to the market, there are ongoing efforts to develop enhanced $5^{th}$ generation (5G) communication systems or pre-5G communication systems. For the reasons, the 5G communication system or pre-5G communication system is called the beyond 4G network communication system or post long term evolution (LTE) system.

For higher data transmit rates, 5G communication systems are considered to be implemented on ultra-high frequency bands millimeter wave (mmWave), such as, e.g., 60 generation (GHz). To mitigate pathloss on the ultra-high frequency band and increase the reach of radio waves, the following techniques are taken into account for the 5G communication system, such as, beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid frequency shift keying (FSK) and quadrature amplitude modulation (QAM), and frequency and quadrature amplitude modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The Internet is evolving from the human-centered connection network by which humans create and consume information to the Internet of things (IoT) network by which information is communicated and processed between things or other distributed components. Another arising technology is the Internet of everything (IoE), which is a combination of the big data processing technology and the IoT technology through, e.g., a connection with a cloud server. To implement the IoT, technology elements, such as a sensing technology, wired/wireless communication and network infra, service interface technology, and a security technology, are required. There is a recent ongoing research for inter-object connection technologies, such as the sensor network, machine-to-machine (M2M), or machine-type communication (MTC).

In the IoT environment may be offered intelligent Internet technology (IT) services that collect and analyze the data generated by the things connected with one another to create human life a new value. The IoT may have various applications, such as the smart home, smart building, smart city, smart car or connected car, smart grid, healthcare, or smart appliance industry, or state-of-art medical services, through conversion or integration of existing IT techniques and various industries.

Thus, there are various ongoing efforts to apply the 5G communication system to the IoT network. For example, the sensor network, M2M, MTC, or other 5G techniques are implemented by schemes, such as beamforming, multi-input multi-output (MIMO), and array antenna schemes. The above-mentioned application of the cloud RAN as a big data processing technique may be said to be an example of the convergence of the 5G and IoT technologies.

The above information is presented as background information only to assist with an understanding of the disclosure. No determination has been made, and no assertion is made, as to whether any of the above might be applicable as prior art with regard to the disclosure.

SUMMARY

To allow a server installed outside a mobile communication system such as $3^{rd}$ generation partnership project (3GPP) to provide a service to a user equipment (UE) in the mobile communication system, the server may require a UE identifier (ID) to interwork with network functions (NFs) of the mobile communication system. However, it may be difficult to preconfigure the UE ID used in the mobile communication system in the server installed outside the mobile communication system. Moreover, use of an internet protocol (IP) address of the UE may also be restrictive. This is because when network address translation (NAT) is used, the UE is not identifiable by the IP address. Accordingly, there is a need for a technique of assigning a different temporary ID for each used service, so that it is impossible to track personal information about a user.

Aspects of the disclosure are to address at least the above-mentioned problems and/or disadvantages and to provide at least the advantages described below. Accordingly, an aspect of the disclosure is to provide an operation of an edge enabler layer in a UE, for providing a service to a dedicated application, and operations related to interworking between external edge computing servers and a core network (CN) of a mobile communication network to which the UE is connected.

Another aspect of the disclosure is to provide an operation for interworking between an application client (AC) and an edge enabler layer in a UE, and an operation between edge computing servers and a CN.

Another aspect of the disclosure is to provide an interworking operation between an AC and an edge enabler client (EEC) included in an edge enabler layer in a UE to support an edge-specific application service, and accordingly, provide an operation between an edge computing server included in the edge enabler layer and a mobile communication CN.

In embodiments of the disclosure, information configured in the AC may be obtained by the EEC.

In embodiments of the disclosure, the EEC may provide the information obtained from the AC to the edge computing server.

In embodiments of the disclosure, configuration information mismatch between the edge computing server and the mobile communication CN may be adjusted according to the information provided by the AC.

Another aspect of the disclosure is to provide an interworking method between an EEC and an AC to provide a continuous service to the AC, when an edge computing server is changed.

Additional aspects will be set forth in part in the description which follows and, in part, will be apparent from the description, or may be learned by practice of the presented embodiments.

In accordance with an aspect of the disclosure, a communication method performed by an EEC of a UE in a wireless communication system supporting edge computing is provided. The communication method includes receiving, from an AC executed in the UE, an AC registration request message including an AC profile, an edge configuration server (ECS) address, and user consent on whether to allow external exposure of the AC profile, selecting an ECS for performing service provisioning, based on the AC registration request message, performing a service provisioning procedure for the selected ECS, performing EEC registration and edge application server (EAS) discovery for an edge enabler server (EES) obtained through the service provisioning procedure, and transmitting EAS information obtained from the EES through the EAS discovery to the AC.

In accordance with another aspect of the disclosure, a communication method performed by an EEC of a UE in a wireless communication system supporting edge computing is provided. The communication method includes receiving, from an AC executed in the UE, an AC registration request message including a storage address of AC-related information, obtaining the AC-related information from the storage address, wherein the AC-related information includes an AC profile, an ECS address, and user consent on whether to allow external exposure of the AC profile, selecting an ECS for performing service provisioning, based on the AC registration request message, performing a service provisioning procedure for the selected ECS, performing EEC registration and EAS discovery for an EES obtained through the service provisioning procedure, and transmitting EAS information obtained from the EES through the EAS discovery to the AC.

In accordance with another aspect of the disclosure, a communication method performed by an EEC of a UE in a wireless communication system supporting edge computing is provided. The communication method includes receiving, from an AC executed in the UE, an AC registration request message including a data network name (DNN), a public land mobile network (PLMN) ID, traffic descriptor information, and a DNN replacement allowance indicator, transmitting a service provisioning request message including the DNN, the traffic descriptor information, and a UE route selection policy (URSP) guidance execution indication to an ECS based on the AC registration request message, receiving a service provisioning response message including a URSP result from the ECS in response to the service provisioning request message, and transmitting, to the AC, an indication indicating that an edge computing service is available, and an indication indicating whether a DNN configured in the AC is available as a traffic descriptor, in response to the reception of the service provisioning response message.

In accordance with another aspect of the disclosure, a communication method performed by an EEC of a UE in a wireless communication system supporting edge computing is provided. The communication method includes receiving, from an AC executed in the UE, an address at which the AC is to receive a notification message, an application package name of the AC, an operation identifier required to induce a specific operation of the AC, and an indication indicating a change of a target EAS, transmitting a subscription request message to a source EES in response to the indication indicating the change of the target EAS, transmitting an AC subscription response message corresponding to the AC subscription request message to the AC, performing an application context reallocation procedure for maintaining service continuity according to movement of the UE from the source EES to a target EES, and transmitting an indication indicating a result of the application context reassignment procedure, and target EAS information to the AC.

According to an embodiment, the ECC of the UE may be configured to perform at least one or a combination of methods according to embodiments of the disclosure.

According to an embodiment, the ECS may be configured to perform at least one or a combination of methods according to embodiments of the disclosure.

Embodiments of the disclosure may provide a temporary configured UE ID to a server (e.g., an ECS) installed outside a mobile communication network operated by an operator, so that the server may use an open function of a 3rd generation partnership project (3GPP) network to provide a service to a UE.

Embodiments of the disclosure may provide a different temporary UE ID for each service or application server and configure the temporary UE ID for a client of an edge computing service within a UE, thereby minimizing exposure of a fixed UE ID and tracking of personal information about a user.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
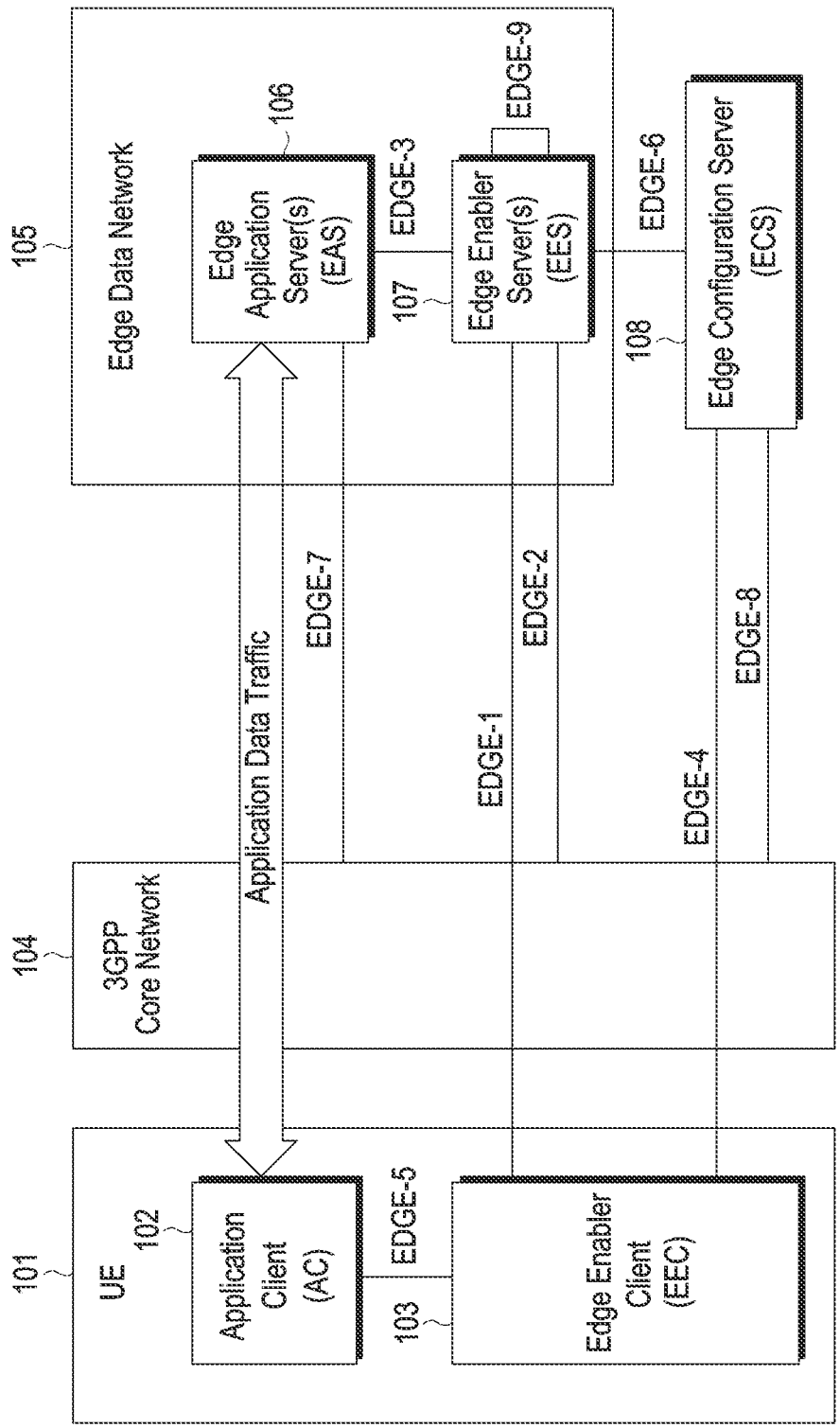
FIG. 1 is a diagram illustrating an application layer network structure and interfaces, which support edge computing according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While for convenience of description, the disclosure may use terms and names defined in a $5^{th}$ generation (5G) system standard, the disclosure is not limited by the terms and names and may be equally applied to systems conforming to other standards.

Embodiments of the disclosure will be described below in detail with reference to the accompanying drawings. Lest it should obscure the subject matter of the disclosure, a detailed description of well-known functions and configurations will be avoided.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to refer to similar or related elements.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., an electronic device). For example, a processor (e.g., a processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

For the 5G network technology and the edge computing technology described in the drawings and description of the disclosure, a standard specification (e.g., TS 23.558) defined by the international telecommunication union (ITU) or 3rd generation partnership project (3GPP) is referred to. Each of components included in a later-described network environment of FIG. 1 may be a physical entity unit or a software or module unit capable of performing an individual function.

In embodiments of the disclosure, an electronic device may refer to various devices used by a user. For example, an electronic device may be a terminal, a user equipment (UE), a mobile station, a subscriber station, a remote terminal, a wireless terminal, or a user device. For convenience, embodiments of the disclosure will be described below in the context of a UE as an electronic device.

In embodiments of the disclosure, an access network (AN) may provide a channel for wireless communication with an electronic device. The AN may be a radio access network (RAN), a base station (BS), an evolved Node B (eNB or eNodeB), a 5G node, a transmission/reception point (TRP), or a 5G Node B (5GNB). According to an embodiment of the disclosure, a core network (CN) may manage at least one of subscriber information about a UE, mobility, access authorization, data packet traffic (traffic), or a charging policy. The CN may include at least one of a user plane function (UPF) node, an access & mobility management function (AMF) node, a session management function (SMF) node, a unified data management (UDM) node, a network exposure function (NEF) node, a policy control function (PCF) node, or an application function (AF) node, and for the functions and operations of nodes (or entities) included in the CN, a standard specification (e.g., TS 23.501) defined by the 3GPP standard may be referred to.

Edge computing is a technology proposed to allow services of an operator and/or a third party to be hosted close to an access point such as a BS, reduce end-to-end latency and load in a network, and thus allow efficient service provision. In this edge computing technology, a data processing time may be shortened by processing data generated at UEs in real time at a short distance from a site where the data is generated without transmitting the data to a central cloud network (hereinafter, referred to as a "central cloud"). For example, the edge computing technology may be applied to a technical field such as an autonomous vehicle requiring rapid processing in various situations that may occur while driving.

Edge computing is a concept of a network architecture that allows cloud computing functions and service environments, and a network for edge computing may be deployed close to a UE. Edge computing may offer benefits such as reduced latency, an increased bandwidth, reduced backhaul traffic, and prospects for new services, compared to a cloud environment. A CN beyond 5G or 6$^{th}$ generation (6G) proposed by the 3GPP may expose network information and functions to edge computing applications (hereinafter, referred to as edge applications).

FIG. 1 is a diagram illustrating an application layer network structure and interfaces, which support edge computing according to an embodiment of the disclosure.

Referring to FIG. 1, a UE 101 may include at least one application client (AC) 102 and an edge enabler client (EEC) 103. The AC 102 may be an application-level client for providing a specific application service to a user, when an edge computing service is provided. The AC 102 may be used for multi-access edge computing (MEC) services. The AC 102 is an application program operating on a mobile operating system (OS) of the UE 101, and may be identified by an application identifier (ID) in a core network (CN) 104. In an environment providing a mobile OS, the AC 102 may be identified by an OS ID and an OS-specific application ID (OSAppID).

While not shown, the UE 101 may further include a communication processor (CP) for communicating with another mobile communication network, for example, at least one mobile communication network. While not shown, the UE 101 may further include an edge configuration client (ECC).

The 3GPP CN 104, which is illustrated as an example of a wireless mobile communication network, may include, for example, an evolved packet core (EPC) and/or a 5G core network (5GC). The 3GPP CN 104 may include at least one BS (Node B) that directly communicates with the UE 101 over the air (OTA), and further include an upper CN configuration. When the 3GPP CN 104 includes the 5GC, the CN configuration may include at least one of an access and mobility management function (AMF), a session management function (SMF), a policy control function (PCF), or a user plane function (UPF). When the 3GPP CN 104 includes the EPC, the CN configuration may include at least one network node corresponding to the 5GC.

The AC 102 of the UE 101 may access an edge data network (EDN) 105 through the 3GPP CN 104. In an embodiment, the EDN 105 may be implemented through network slicing, and a plurality of EDNs capable of interworking with the CN 104 may be configured in the same form. The EDN 105 may be a data network of the 5GC or a packet data network of the EPC network. For example, the EDN 105 may include an edge hosting platform, an edge enabler server (EES) 107, and at least one edge application server (EAS) 106. In an embodiment, the EES 107 may include an edge enabler client manager, an edge enabler platform, and an edge enabler application programming interface (API) server.

The EAS 106 may be a virtual machine (VM) image operating in an edge hosting environment or a third party application server program operating in a virtualization container. The EAS 106 may be configured to provide an ultra-low latency service at a location close to the UE 101. The edge hosting platform may be platform software including a virtualization layer capable of executing a plurality of edge application programs. In the disclosure, an edge hosting platform and an edge hosting environment may be used in the same concept.

The edge computing system may include the EES 107, an edge configuration server (ECS) 108, and the EEC 103, and provide an edge computing service to the AC 102 of the UE 101.

The EES 107, which is a server that provides the edge computing service, may manage a list of application programs available for the EEC 103 of the UE 101 on the edge hosting environment (or edge hosting platform), manage configuration information about edge application programs (e.g., at least one EAS 106) operating on the edge hosting platform, and provide an API for functions provided by the 3GPP CN to the edge application programs.

The EES 107 may negotiate with the EEC 103 of the UE 101 to connect the AC 102 of the UE 101 to the EAS 106 in the edge hosting environment. The negotiation may be carried out through interaction between the EEC 103 and the EES 107, and the EEC 103 and the EES 107 that perform interaction such as negotiation may be referred to as an edge enabler layer.

The EEC 103, which is a software module of the UE 101, may be a software agent having functions for providing the edge computing service. The EEC 103 may determine an application to use the edge computing service, and perform an operation of connecting a network interface so that data of the AC 102 may be transmitted to the EAS 106 providing the edge computing service. The operation of establishing a data connection for using the edge computing service may be performed in a 3GPP communication layer through a mobile communication function of the UE 101 (e.g., mobile terminal (MT)). The 3GPP communication layer may perform a modem operation for using a mobile communication system, establish a wireless connection for data communication, register a UE in the mobile communication system, establish a connection for data transmission in the mobile communication system, and transmit and receive data.

The EEC 103 may perform at least one of an authentication function for accessing an edge computing server (e.g., the EES 107 and/or the ECS 108), a function of obtaining access information about the EDN 105 and the EES 107 by interworking with the ECS 108, a function of obtaining information about at least one EAS 106 from the EES 107, or a function of routing traffic of at least one AC 102 in the UE 101 to at least one EAS 106 based on information about the at least one EAS 106.

While not shown, the EDN 105 may include an orchestrator for an edge hosting platform (not shown). The orchestrator may be a management system for managing the edge hosting platform and the life cycles of edge application programs operating on the edge hosting platform, and perform orchestrator functions defined by the European telecommunication standards institute management and network operation (ETSI MANO).

The ECS 108, which is distinct from the EDN 105 and communicable with the EEC 103 of the UE 101 through the 3GPP CN 104, may be an initial access server through which the UE 101 may be provided with configuration information for using a mobile edge computing (MEC) service. The ECS 108 may have knowledge of deployment information about the EES 107, and provide the UE 101 with configuration information related to the EDN 105, for using the edge computing service.

The configuration information may include at least one of EDN connection information (e.g., including at least one of a data network name (DNN) or single network slice selection assistance information (S-NSSAI)), service area information (e.g., a cell list, a list of tracking areas, and a public land mobile network (PLMN) ID) about the EDN 105, or connection information (e.g., a uniform resource identifier (URI)) about the EES 107.

The service area of the EDN 105 may be an area configured by the EES 107. The UE 101 may obtain information about the EES 107 accessible at a current location, based on the information about the service area of the EDN 105. When the ECS 108 of the EDN 105 has information about the EAS 106 operating in the edge hosting environment of the specific EES 107, the UE 101 may obtain the information from the ECS 108 through the EEC 103.

In FIG. 1, EDGE-1 to EDGE-8 denote network interfaces (i.e., reference points) between objects, and are described in, but not limited to, Table 1 below.

TABLE 1

| Reference Points | Description |
|---|---|
| EDGE-1 | EDGE-1 reference point enables interactions between the Edge Enabler Server and the Edge Enabler Client. It supports:<br>a) registration and de-registration of the Edge Enabler Client to the Edge Enabler server;<br>b) retrieval and provisioning of Edge Application Server configuration information; and<br>c) discovery of Edge Application Servers available in the Edge Data Network. |
| EDGE-2 | Edge-2 reference point enables interactions between the Edge Enabler Server and the 3GPP Core Network. It supports access to 3 GPP Core Network functions and APIs for retrieval of network capability information |
| EDGE-3 | EDGE-3 reference point enables interactions between the Edge Enabler Server and the Edge Application Servers. It support:<br>a) registration of Edge Application Servers with availability information (e.g. time constraints, location constraints);<br>b) de-registration of Edge Application Servers from the Edge Enabler Server; and<br>c) providing access to network capability information (e.g. location information). |
| EDGE-4 | EDGE-4 reference point enables interactions between the Edge Configuration Server and the Edge Enabler Client. It supports provisioning of Edge configuration information to the Edge Enabler Client. |
| EDGE-5 | EDGE-5 reference point enables interactions between Application Client(s) and the Edge Enabler Client. |
| EDGE-6 | EDGE-6 reference point enables interactions between the Edge Configuration Server and the Edge Enabler Server. It supports registration of Edge Enabler Server information to the Edge Enabler Network Configuration Server. |
| EDGE-7 | EDGE-7 reference point enables interactions between the Edge Application Server and the 3GPP Core Network. It supports access to 3GPP Core Network functions and APIs for retrieval of network capability information. |

TABLE 1-continued

| Reference Points | Description |
|---|---|
| EDGE-8 | EDGE-8 reference point enables interactions between the Edge Configuration Server and the 3GPP Core network. |
| EDGE-9 | EDGE-9 reference point enables interactions between two EESs. EDGE-9 reference point may be provided between EES within different EDN and within the same EDN. |

The application network structure for supporting edge computing illustrated in FIG. 1 may be managed by an edge computing operator separate from a mobile communication operator, and thus a plurality of separate edge computing operators may exist in one mobile communication operator network. The application layer network structure for supporting edge computing illustrated in FIG. 1 may support the configuration of such an operator.

The application layer network structure illustrated in FIG. 1 may support a plurality of edge computing operators in one mobile communication network. The application layer network structure may transmit, to a UE, information about a plurality of edge computing service providers available in one mobile communication network and configuration information for accessing edge computing networks installed by the operators.

The application layer network structure illustrated in FIG. 1 may transmit, to a UE, information about an edge network service provider selected from among a plurality of edge computing operators existing in one mobile communication network by a mobile communication operator, and configuration information for accessing an edge computing network installed by the selected edge network service provider.

Figure 2:
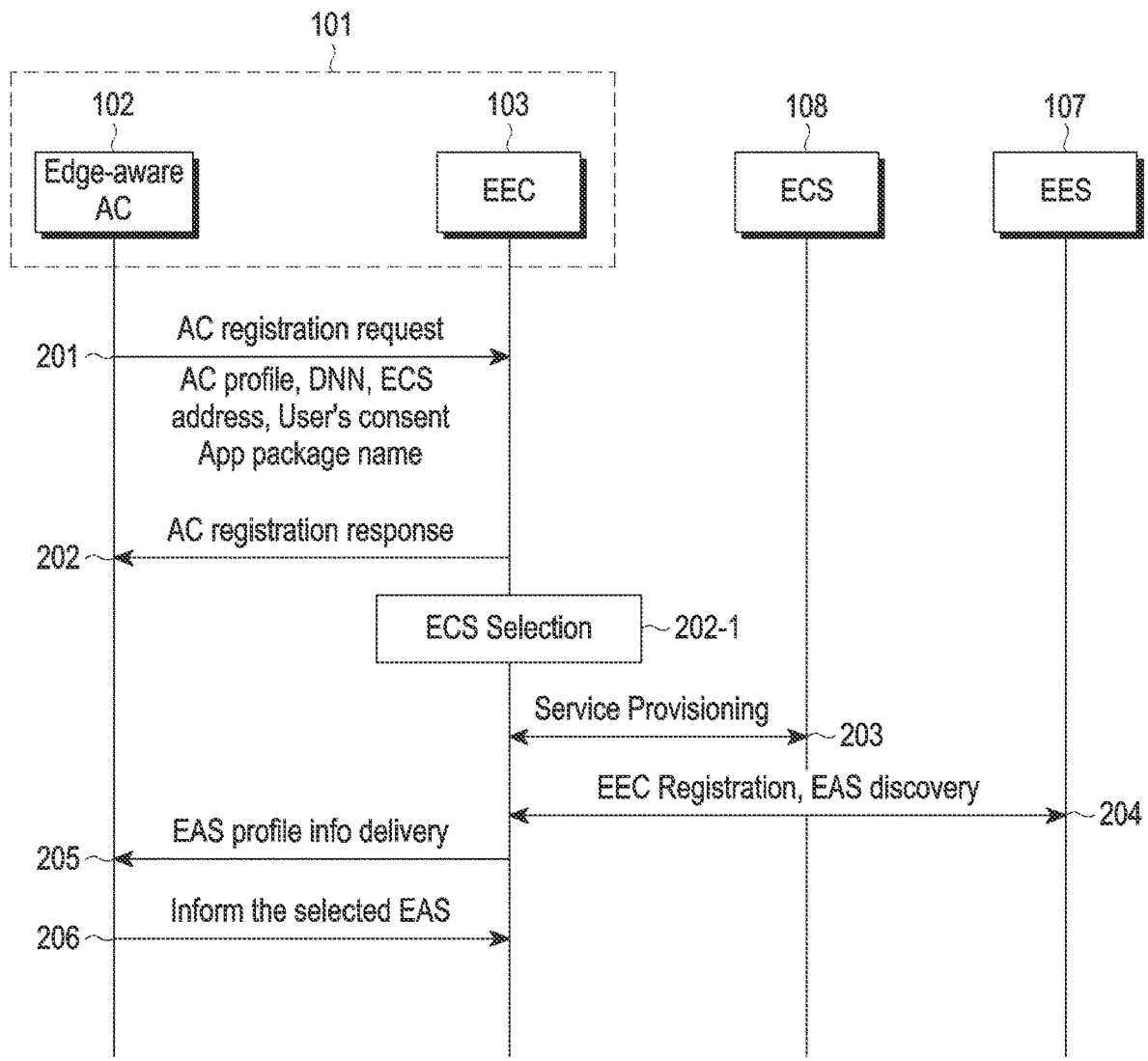
FIG. 2 is a diagram illustrating a signal flow for procedure of providing application client (AC) information according to an embodiment of the disclosure.

FIG. 2 is a diagram illustrating a signal flow for procedure of providing AC information according to an embodiment of the disclosure.

Referring to FIG. 2, in operation 201, an AC 102 may transmit an AC registration request message to an EEC 103. In an embodiment, conditions for performing the transmission of the AC registration request message may include at least one of installation of the AC 102 in the UE 101, execution of the AC 102, or generation of data traffic in the AC 102. In an embodiment, the AC registration request message may include at least one piece of the following information.

An AC profile (e.g., including at least one of an AC ID, an AC type, or a key performance indicator) configured in the AC 102.

Table 2 below illustrates an example of the AC profile.

TABLE 2

| Information element | Status | Description |
|---|---|---|
| ACID | M | Identity of the AC. |
| AC Type | O | The category or type of AC (e.g. V2X). This is an implementation specific value. |
| Preferred ECSP list | O | When used in a service provisioning request, this IE indicates to the ECS which ECSPs are preferred for the AC. The ECS may use this information in the selection of EESs. |
| AC Schedule | O | The expected operation schedule of the AC (e.g, time windows) |
| Expected AC Geographical Service Area | O | The expected location(s) (e.g. route) of the hosting UE during the AC's operation schedule. This geographic information can express a geographic point, polygon, route. signalling map, or waypoint set. |
| AC Service Continuity Support | O | Indicates if service continuity support is required or not for the application. The IE also indicates which ACR scenarios are supported by the AC and which of these are preferred by the AC. |
| List of EASs | O | List of EAS that serve the AC along with the service KPIs required by the AC |
| > EASID | M | Identifier of the EAS |
| > Expected AC Service KPIs | O | KPIs expected in order for ACs to receive currently required services from the EAS, as described in Table 8.2.3-1 |
| > Minimum required AC Service KPIs | O | Minimum KPIs required in order for ACs to receive meaningful services from the EAS, as described in Table 8.2.3-1 |

A DNN (which may be the same value as a DNN that identifies an EDN) configured in the AC.

At least one of an ECS address identifying an ECS (e.g., the ECS 108 of FIG. 1) configured in the AC 102, an ECS provider ID (or an edge computing service provider ID), or an indicator indicating whether an ECS other than the ECS address configured in the AC 102 is available.

User consent on whether to allow external exposure of the AC profile: when the user consent is included in the AC registration request message, the EEC 103 may include the AC profile in a service provisioning request message (e.g., in operation 203) or an EAS discovery request message (e.g., in operation 204) to be transmitted to the EES 107 or the ECS 108.

Call information (e.g., an application package name/ID) available for use in calling the AC 102 by another application or device (e.g., the EEC 103) within the UE 101 (the information may vary depending on the OS of the UE 101): the call information may be used to guide the EEC 103 to call the AC 102 and perform a specific operation (e.g., an operation of requesting user consent on external exposure of the AC profile).

Information (e.g., an operation ID or an activity name) required to induce a specific operation of the AC 102: the information may include, for example, initialization of a cached server address as information used for the EEC 103 to call the AC 102 to induce the specific operation, when needed. The operation ID/activity name may be used to request the AC 102 to induce the specific operation (e.g., an operation of requesting user consent on external exposure of the AC profile) through the OS of the UE 101.

An EAS selection request delegation indicator: when the EEC 103 discovers a plurality of EASs, the indicator may be used to instruct the EEC 103 to perform an operation of selecting at least one (e.g., the EAS 106) of the EASs and indicating the selected EAS to the AC 102. When the indicator is not included in the AC registration request message, or when the indicator instructs all of the discovered EASs to be indicated, the EEC 103 may transmit information (e.g., addresses or IDs) about all of the discovered EASs to the AC 102 by a message (e.g., in operation 205).

In operation 202, the EEC 103 may perform at least one of the following operations in response to the AC registration request message received from the AC 102 and transmit an AC registration response message to the AC 102.

The EEC 103 may store the AC profile received from the AC 102 for use in a service provisioning procedure or an EAS discovery procedure.

The EEC 103 may store the ECS address and the ECS provider ID received from the AC 102, together with an existing ECS address that the EEC 103 has already stored. When the indicator indicating whether an ECS other than the configured ECS address is available is provided together with the ECS address from the AC 102, the EEC 103 may use other ECS information (e.g., including at least one of the ECS address configured in the EEC 103, an ECS address received from the 5GC by signaling, or an ECS address derived from a serving PLMN ID), instead of the ECS address received from the AC 102.

In operation 202-1, the EEC 103 may select an ECS (e.g., the ECS 108) which will perform the service provisioning procedure, based on the information received from the AC 102.

In an embodiment, target ECS(s) for performing service provisioning may be selected as follows.

When the ECS address is received from the AC 102, and no ECS address is configured in the EEC 103 or no ECS address is received from the 5GC (e.g., the CN 104), the EEC 103 may perform service provisioning, using the ECS address received from the AC 102.

When the ECS address is received from the AC 102, and there is an ECS address configured in the EEC 103, the EEC 103 may perform service provisioning first for ECS(s) having the ECS address obtained from the AC 102. In an embodiment, when the service provisioning for the ECS(s) having the ECS address obtained from the AC 102 fails, the EEC 103 may perform service provisioning again, using the ECS address configured in the EEC 103.

In operation 203, the EEC 103 may select an EES (e.g., the EES 107) of an EDN (e.g., the EDN 105) to be accessed by performing the service provisioning procedure for the selected ECS. The service provisioning procedure may provide information required for the UE 101 to access the edge computing service, and may involve, for example, a service provisioning request message and a service provisioning response message.

When the AC profile and the user consent on external exposure of the AC profile are received from the AC 102, the EEC 103 may include the AC profile in the service provisioning request message to be transmitted to the ECS 108. When an available edge computing service provider is specified in the user consent, the EEC 103 may compare the specified edge computing service provider with the ECS provider ID included in the AC registration request message to determine whether to include the AC profile in the service provisioning request message. In an embodiment, when the edge computing service provider specified in the user consent matches the ECS provider ID included in the AC registration request message, the EEC 103 may determine to include the AC profile in the service provisioning request message.

When there is no user consent in the AC registration request message, the EEC 103 may determine to use the AC profile only within the UE 101, and may not include the AC profile in the service provisioning request message to be transmitted to the ECS 108.

The EEC 103 may obtain configuration information related to the EES 107 in the EDN 105 from a service provisioning response message received in response to the service provisioning request message.

In operation 204, the EEC 103 may transmit an EEC registration request message and/or an EAS discovery request message to the EES 107 obtained from the ECS 108 through the service provisioning. Similarly to in operation 203, the EEC registration request message and/or the EAS discovery request message may include the AC profile obtained from the AC 102, when the user consent is included in the AC registration request message. The EEC 103 may receive, from the EES 107, at least one response message corresponding to the EEC registration request message and/or the EAS discovery request message. The response message may include EAS information (e.g., an address and/or an ID).

In operation 205, the EEC 103 may transmit the EAS information obtained from the EES 107 to the AC 102 by an EAS profile info delivery message. When a plurality of pieces of EAS information are obtained in the service provisioning procedure, the EEC 103 may determine EAS information to be included in the EAS profile info delivery message according to whether the EAS selection request delegation indicator is included in the AC registration request message received in operation 201.

In an embodiment, when the EAS selection delegation request indicator is not included in the AC registration request message of operation 201, or the EAS selection delegation request indicator included in the AC registration request message instructs transmission of all of the detected EAS information to the AC 102, the EEC 103 may provide all of the EAS information obtained from the EES 107 to the AC 102 by the EAS profile info delivery message. Otherwise, for example, when the EAS selection delegation request indicator is not included in the AC registration request message, or when the EAS selection delegation request indicator is included in the AC registration request message, and does not instruct transmission of all of the EAS information to the AC 102, the EEC 103 may select one of the plurality of pieces of EAS information obtained from the EES 107, and provide the selected EAS information to the AC 102 by the EAS profile info delivery message. The AC 102 may access an EAS (e.g., the EAS 106) according to the EAS information received from the EEC 103 to receive the edge computing service.

In an embodiment of operation 205, when the EEC 103 provides the EAS information to the AC 102, the EEC 103 may provide a DNN value indicating an EDN (e.g., an EDN in which an EAS is installed) to be connected to access the EAS, together with EAS address information. To transmit and receive data traffic to and from the EAS, the AC 102 may provide the DNN value indicating the EDN, received from the EEC 103 to a modem to induce generation of a protocol data unit (PDU) session for a corresponding DNN in a PDU session creation procedure.

When a plurality of pieces of EAS information are received from the EEC 103, the AC 102 may select an EAS (e.g., the EAS 106) to be actually connected based on the plurality of pieces of EAS information, access the selected EAS 106, and receive the edge computing service. In operation 206, the AC 102 may transmit EAS information indicating the selected EAS 106 to the EEC 103. In an embodiment, the EEC 103 may provide the EES 107 with the EAS information indicating the EAS 106 selected by the AC 102.

In an embodiment, when the AC registration request message received from the AC 102 by the EEC 103 does not include user consent allowing external exposure of the AC profile, the EEC 103 may transmit the service provisioning request message without the AC profile to the ECS 108, and receive a result of a service provisioning failure from the ECS 108 by the service provisioning response message in operation 203.

In an embodiment, the EEC 103 may request user consent for obtaining the AC profile from the AC 102, when the EEC 103 identifies that a service provisioning failure cause included in the service provisioning response message indicates non-provisioning of the AC profile, or based on an autonomous determination of the EEC 103 after the service provisioning failure.

Specifically, the EEC 103 may transmit a user consent request message including an ECS provider ID (or an edge computing service provider ID) to the AC 102, using the call information (e.g., the application package name/ID) received from the AC 102. After performing an operation (e.g., a user interface) for obtaining user consent on transmission of the AC profile to an ECS provider specified by the ECS provider ID or the edge computing service provider ID received from the EEC 103, the AC 102 may indicate to the EEC 103 whether the user consent has been obtained.

The operation of requesting the user consent from the AC 102 by the EEC 103 may be performed as part of an EAS discovery procedure for the EES 107 (in operation 204). In an embodiment, upon receipt of an EAS discovery response message indicating failure of the EAS discovery request from the EES 107 in operation 203, the EEC 103 may perform the operation of requesting the user consent from the AC 102 as described above. As described above, the EEC 103 may request the user consent on transmission of the AC profile to the EES provider, while providing the EES provider ID to the AC 102.

Figure 3:
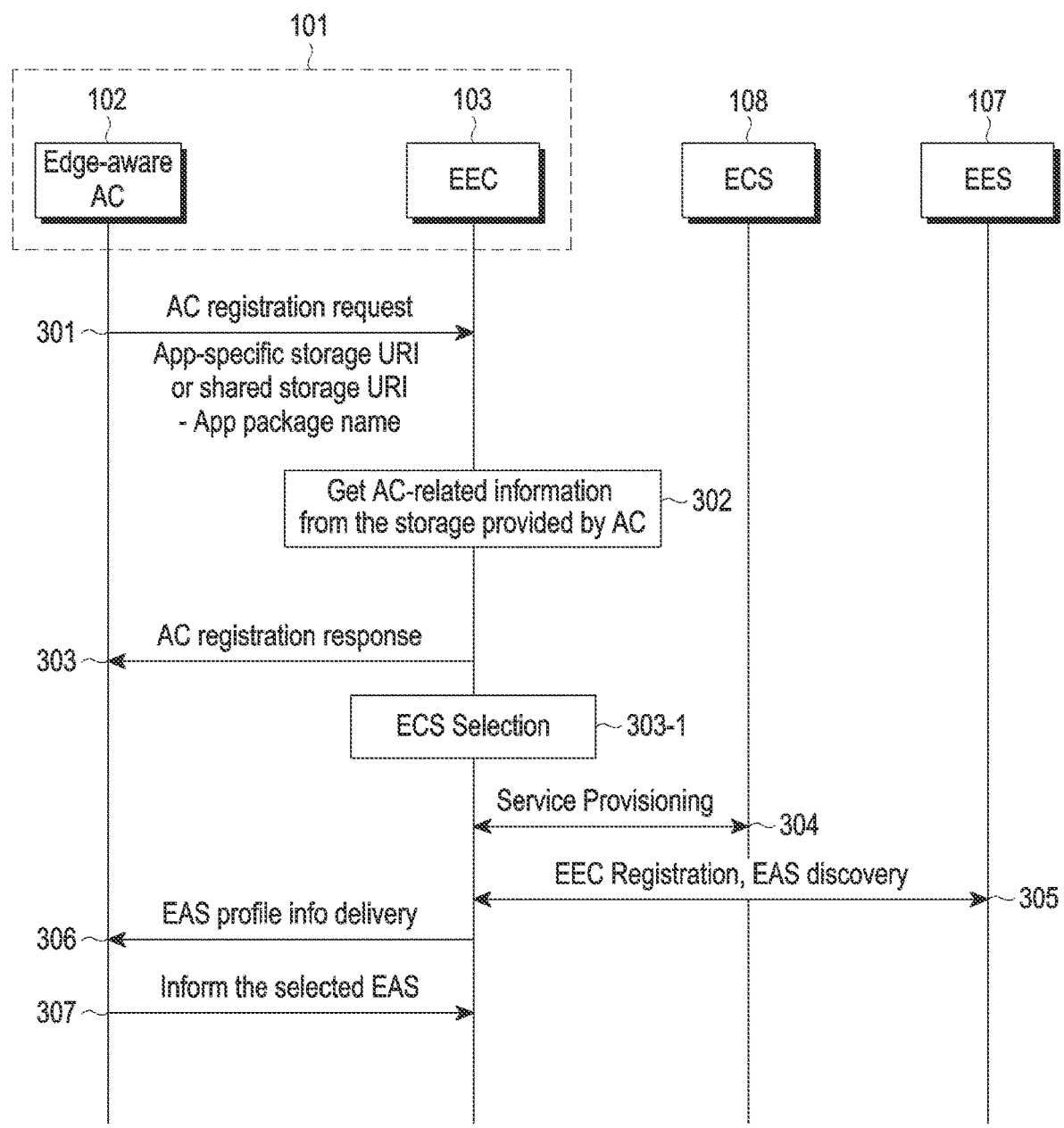
FIG. 3 is a diagram illustrating a signal flow for procedure of providing AC information according to an embodiment of the disclosure.

FIG. 3 is a diagram illustrating a signal flow for procedure of providing AC information according to an embodiment of the disclosure.

Referring to FIG. 3, in operation 301, an AC 102 may transmit an AC registration request message to an EEC 103.

In an embodiment, the AC registration request message may be transmitted after the AC 102 is completely installed and a storage location (internal memory of the UE 101 or an external storage device (e.g., a shared storage space)) for information (e.g., an AC profile) about the AC 102 is determined. In an embodiment, the AC registration request message may include at least one piece of the following information.

- A storage address (e.g., an app-specific storage URI or a shared storage URI) indicating the storage location of AC-related information.
- Call information (e.g., an application package name/ID) available for use in calling the AC 102 by another application or device (e.g., the EEC 103) within the UE 101.
- An EAS selection request delegation indicator: when the EEC 103 discovers a plurality of EASs, the indicator may be used to instruct the EEC 103 to perform an operation of selecting at least one (e.g., the EAS 106) of the EASs and indicating the selected EAS to the AC 102. When the indicator is not included in the AC registration request message, or when the indicator instructs all of the discovered EASs to be indicated, the EEC 103 may transmit information (e.g., addresses or IDs) about all of the discovered EASs to the AC 102 by a message (e.g., in operation 306).

In operation 302, the EEC 103 may obtain at least one piece of the following AC-related information, using the storage address received from the AC 102 in the AC registration request message.

- An AC profile (e.g., including at least one of an AC ID, AC type, or a key performance indicator) configured in the AC 102.
- A DNN configured in the AC 102 (it may be a DNN that identifies an EDN).
- At least one of an ECS address identifying an ECS (e.g., the ECS 108 of FIG. 1) configured in the AC 102, an ECS provider ID (or an edge computing service provider ID), or an indicator indicating whether an ECS other than the ECS address configured in the AC 102 is available.
- User consent on whether to allow external exposure of the AC profile: when the EEC 103 obtains the user consent, the EEC 103 may include the AC profile in a service provisioning request message (e.g., in operation 304) or an EAS discovery request message (e.g., in operation 305) to be transmitted to the EES 107 or the ECS 108.
- Call information (e.g., an application package name/ID) available for use in calling the AC 102 by another application or device (e.g., the EEC 103) within the UE 101 (the information may vary depending on the OS of the UE 101): the call information may be used to guide the EEC 103 to call the AC 102 and perform a specific operation (e.g., an operation of requesting user consent on external exposure of the AC profile).
- Information (e.g., an operation ID or an activity name) required to induce a specific operation of the AC 102: the information may include, for example, initialization of a cached server address as information used for the EEC 103 to call the AC 102 to induce the specific operation, when needed. The operation ID/activity name may be used to request the AC 102 to induce the specific operation (e.g., the operation of requesting user consent on external exposure of the AC profile) through the OS of the UE 101.

In operation 303, the EEC 103 may identify that the AC-related information is obtainable from the storage location provided by the AC 102 through the AC registration request message, for use in a service provisioning procedure (e.g., operation 304) or an EAS discovery procedure (e.g., operation 305), and transmit an AC registration response message to the AC 102. When the EEC 103 fails in obtaining the AC-related information from the storage location, the EEC 103 may include an indicator requesting the AC-related information in the AC registration response message transmitted to the AC 102. In an embodiment, the indicator may indicate at least one of an ECS address request indication, a traffic descriptor request indication, a configured DNN request indication, or a request for user consent on external sharing and exposure of the AC profile.

Operations 303-1, 304, 305, 306, and 307 may be identical to operations 202-1, 203, 204, 205, and 206 of FIG. 2.

In operation 303-1, the EEC 103 may select an ECS (e.g., the ECS 108) of an EDN (e.g., the EDN 105) to be accessed, and at least one ECS (e.g., the ECS 108), based on the AC-related information. In operation 304, the EEC 103 may perform a service provisioning procedure for the selected ECS. When an AC profile and user consent for the AC profile and external exposure of the AC profile is obtained, the EEC 103 may include the AC profile in a service provisioning request message transmitted to the ECS 108 in the service provisioning procedure. The EEC 103 may obtain configuration information related to the EES 107 in the EDN 105 from a service provisioning response message corresponding to the service provisioning request message.

In operation 305, the EEC 103 may transmit an EEC registration request message and/or an EAS discovery request message to the EES 107 based on the configuration information. When the user consent is included in the AC registration request message, the EEC registration request message and/or the EAS discovery request message may include the AC profile obtained from the AC 102. The EEC 103 may receive at least one response message corresponding to the EEC registration request message and/or the EAS discovery request message from the EES 107. The response message may include EAS information (e.g., an address and/or an ID).

In operation 306, the EEC 103 may transmit the EAS information obtained from the EES 107 to the AC 102 by an EAS profile info delivery message. When a plurality of pieces of EAS information are obtained in the service provisioning procedure, and the EAS selection request delegation indicator is included in the AC registration request message received in operation 301, the EEC 103 may select one of the plurality of pieces of EAS information obtained from the EES 107, and transmit be selected EAS information to the AC 102 in the EAS profile information transfer message. The AC 102 may access an EAS (e.g., the EAS 106) according to the EAS information received from the EEC 103 to receive the edge computing service.

When receiving a plurality of pieces of EAS information are received from the EEC 103, the AC 102 may select an EAS (e.g., the EAS 106) to be actually connected based on the plurality of pieces of EAS information, access the selected EAS 106, and receive the edge computing service. In operation 307, the AC 102 may transmit information about the selected EAS 106 to the EEC 103. In an embodiment, the EEC 103 may provide the EES 107 with the EAS information indicating the EAS 106 selected by the AC 102.

In an embodiment, upon receipt of an EAS discovery response message indicating EAS discovery request failure from the ECS 108 in operation 304, the EEC 103 may perform an operation of requesting user consent from the AC 102 as described above. As described above, the EEC 103 may request the user consent on whether to provide the AC profile to an ECS provider while providing an ECS provider ID to the AC 102.

In an embodiment to be described later, the EEC 103 may induce a UE route selection policy (URSP), using the AC-related information (e.g., application information) obtained from the AC 102. A URSP rule may be used to steer packing between applications of the UE 101 and PDU sessions.

In an embodiment, upon receipt of a DNN from the AC 102, or upon receipt of traffic descriptor information that may be matched to a traffic descriptor and a DNN replacement allowance (granted) indication from the AC 102, the EEC 103 may guide URSP determination/provisioning of the ECS 108 based on the DNN or based on the traffic descriptor information and the DNN replacement allowance (granted) indication. In an embodiment, the traffic descriptor information may include, for example, at least one of a domain descriptor, connection capability, slice information, or a traffic type. In an embodiment, the DNN replacement allowance (granted) indication may include a PLMN ID indicating a PLMN in which the replacement is allowed by an AC provider.

Figure 4:
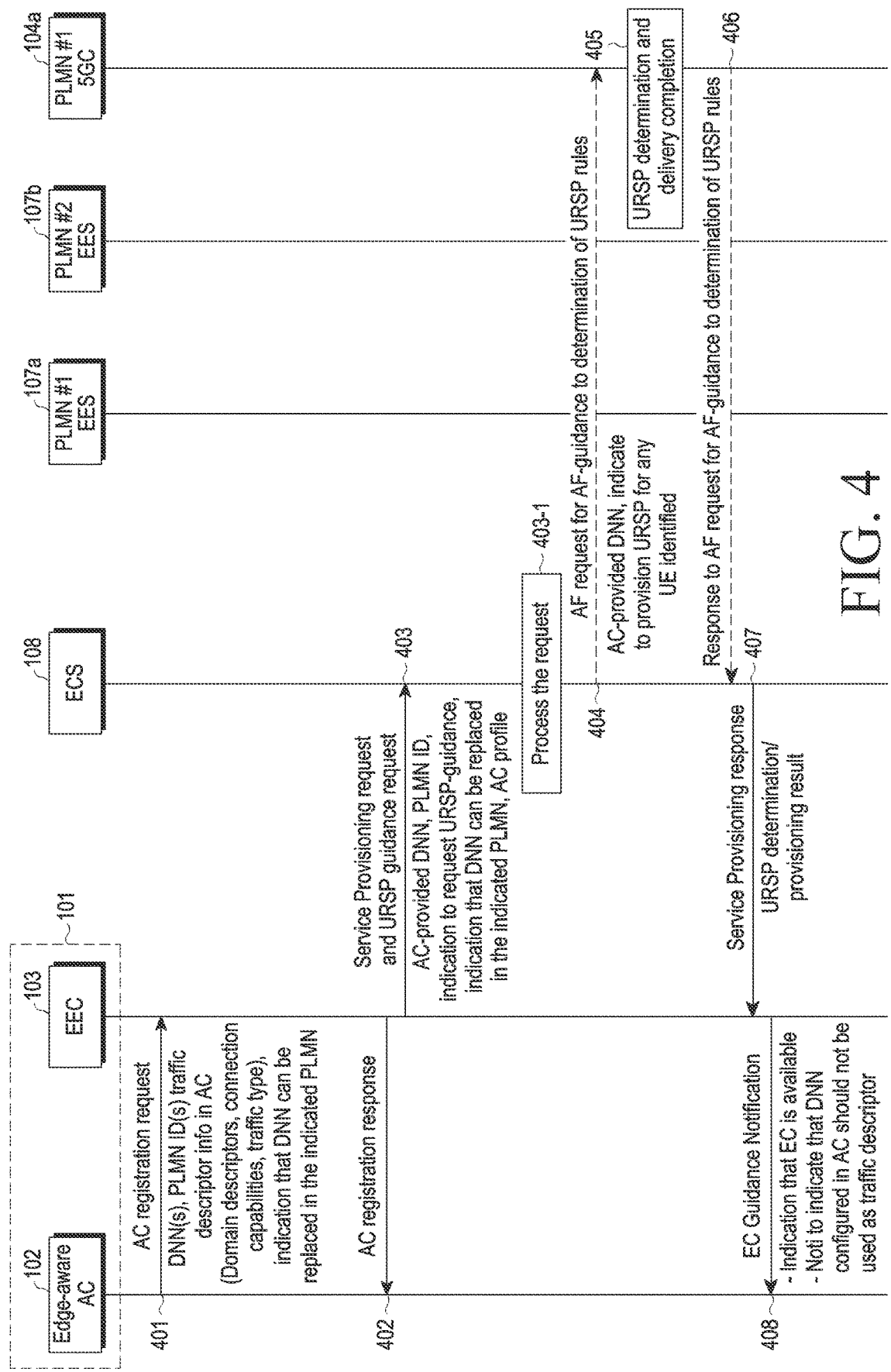
FIG. 4 is a diagram illustrating a signal flow for a procedure of performing UE route selection policy (URSP) guidance based on AC information according to an embodiment of the disclosure.

FIG. 4 is a diagram illustrating a signal flow for a procedure of performing URSP guidance based on AC information according to an embodiment of the disclosure.

Referring to FIG. 4, in operation 401, an EEC 103 may receive, from an AC 102, an AC registration request message including at least one of at least one DNN (hereinafter, referred to as AC-provided DNN), at least one PLMN ID, traffic descriptor information that may match a traffic descriptor, or an DNN replacement allowance (granted) indication. In an embodiment, the traffic descriptor information may include at least one of domain descriptor(s), connection capability(s), traffic type(s), an AC-provided domain name (e.g., a fully qualified domain name (FQDN)), a traffic category, or requested network connection capabilities that may match a traffic descriptor in the URSP (e.g., ims or xr/vr).

In an embodiment, the DNN replacement allowance (granted) indication may include a list of PLMN IDs indicating PLMNs where replacement is allowed by an AC provider. In an embodiment, the list of PLMN IDs may indicate PLMN #1 107a and PLMN #2 107b.

In an embodiment, a DNN provided by the AC 102 may be configured according to an agreement between an operator of a specific mobile communication network and the AC provider. The DNN may be valid only in the mobile communication network. The DNN or the traffic descriptor information may be transmitted to the EEC 103, for example, in the AC registration request message of the AC 102. In addition, the ECS address configured in the AC 102 may be provided to the EEC 103 together with the DNN or the traffic descriptor information.

In operation 402, the EEC 103 may transmit an AC registration response to the AC registration request message to the AC 102. The AC registration response message may include a result indicating that the information provided by the AC 102 has been successfully received and stored.

In operation 403, the EEC 103 may identify whether the UE 101 has accessed/registered to the 5GC and whether the UE supports the URSP, by an operation such as interworking with an MT, and transmit a service provisioning request message and a URSP guidance request message to the ECS 108, for AF-guidance to USRP determination/provisioning of the ECS 108. In an embodiment, the service provisioning request message may include the information received from the AC 102 in operation 401 and a URSP guidance execution indication.

In an embodiment, the EEC 103 may operate as follows.

A. Upon receipt of a list of {DNN, PLMN ID} pairs from the AC 102, the EEC 103 may transmit the AC-provided DNN, the AC-provided domain name (e.g., FQDN), the traffic category, or the requested network connection capabilities that may match to the traffic descriptor in the URSP (e.g., ims, xr/vr,) and the URSP guidance execution indication (an indication to request URSP guidance or an indication to request to perform AF-guidance to URSP) to the ECS 108. For example, the information may be included and transmitted in the service provisioning request message. The EEC 103 may induce the ECS 108 to perform an AF-guidance to URSP determination operation through the information.

In an embodiment, the EEC 103 may include URSP guidance execution indication for any UE (an indication to guide URSP rules for any UE) using the same service in a message (e.g., the service provisioning request message or the URSP guidance request message) transmitted to the ECS 108. The indication to guide URSP rules for any UE is intended to also allow the URSP to be applied to another UE using the same service. The EEC 103 may operate as follows according to the information provided by the AC 102.

Upon receipt of a plurality of {DNN, PLMN ID} pairs from the AC 102, the EEC 103 may transmit an AC-provided DNN corresponding to a serving PLMN ID to which the UE 101 is currently connected in the service provisioning request message, or transmit the list of {DNN, PLMN ID} pairs received from the AC 102 to the ECS 108.

When the EEC 103 knows URSP rules currently configured for the UE 101, the EEC 103 may determine whether collision occurs in the URSP rules. In an embodiment, the EEC 103 may identify whether a DNN based on the URSP rules of the UE 101 (a DNN value included in a routing selection descriptor in the URSP rules, configured in the UE or received from the CN) is the same as or different from a DNN in EDN configuration information received form the ECS 108. When the DNNs are different, the EEC 103 may identify that collision has occurred. In an embodiment, when the AC-provided DNN is different from the EDN configuration information, the EEC 103 may include the URSP guidance execution indication in the service provisioning request message transmitted to the ECS 108.

B. When the AC 102 provides the traffic descriptor information (e.g., at least one of the AC-provided domain name (e.g., FQDN), the traffic category, or the requested network connection capabilities) that may match to a traffic descriptor, the EEC 103 may identify a route selection component matching the traffic descriptor information within the URSP rules configured in the UE 101. When the DNN matching the traffic descriptor information is different from the DNN included in the EDN configuration information, the EEC 103 may provide the URSP guidance execution indication together with the traffic descriptor information (e.g., the at least one of the AC-provided domain name (e.g., FQDN), the traffic category, or the requested network connection capabilities) to the ECS 108. In an embodiment, even when there is no EDN configuration information in the EEC 103, the EEC 103 may provide the URSP guidance execution indication together with the traffic descriptor information to the ECS 108.

According to an embodiment, in operation 403, the EEC 103 may provide the URSP guidance execution indication and the traffic descriptor information to the ECS 108 in a separate URSP guidance induction procedure, not in the service provisioning procedure.

In operation 403-1, the ECS 108 may determine whether the URSP guidance execution indication is included in the message (e.g., the service provisioning request message) received from the EEC 103, and process a service provisioning request according to the service provisioning request message. When the URSP guidance execution indication is included in the service provisioning request message, the ECS 108 may transmit an AF request message for AF-guidance to determination of URSP rules to an NF node (e.g., an NEF or a PCF) of a CN to which the UE 101 is connected and registered in operation 404.

In an embodiment, the ECS 108 may determine a PLMN which is to be selected and to which the AF request message is to be transmitted, based on the information received from the EEC 103. In an embodiment, the ECS 108 may select an NF node 104a to which a serving PLMN (e.g., PLMN #1 of the 5GC) of the UE 101 belongs, based on the AC-provided PLMN ID received from the EEC 103 in the service provisioning request message in operation 403 and the serving PLMN ID to which the UE 101 is currently connected, and transmit the AF request message to the selected NF node 104a.

The AF request message may include an application traffic descriptor containing at least one of the AC-provided DNN, the AC-provided domain name (e.g., FQDN), the traffic category, or the requested network connection capabilities, received from the EEC 103 in operation 403, and EDN connection information (e.g., a DNN and/or S-NSSAI) for an EDN (e.g., the EDN 105) as a route selection parameter.

When the ECS 108 receives the "indication to guide URSP rules for any UE" in the service provisioning request message or the URSP guidance request message from the EEC 103 in operation 403, the ECS 108 may transmit the indication in the AF request message to the NF node 104a. In an embodiment, when a service area is defined for the EDN 105, the EES 107 or the EAS 106, the ECS 108 may transmit the AF request message with a "spatial validity condition" set to a value (e.g., a tracking area identity (TAI) or geographic area information) to the NF node 104a.

In operation 405, the NF node 104a (e.g., the NEF) may trigger a procedure of generating URSP rules by performing URSP determination based on the AF request message received from the ECS 108, and transmitting the generated URSP rules to the UE 101. In an embodiment, information about the URSP rules may be transmitted to the UE 101 through a mobile communication network by at least one NF node of the CN.

In operation 406, the NF node 104a may identify that the URSP rules have been successfully delivered to the UE 101 through the mobile communication network, and transmit a response message to the AF request message to the ECS 108. The response message may include an indication indicating that the URSP rules have been successfully configured in the UE 101.

In operation 407, the ECS 108 may transmit a response message (e.g., a service provisioning response message) to the message (e.g., the service provisioning request message) received from the EEC 103 in operation 403 to the EEC 103. The service provisioning response message may include a result ("URSP determination") indicating successful execution of AF-guidance to URSP, together with EDN configuration information.

In operation 408, the EEC 103 may identify the EDN configuration information received from the ECS 108 and the success of AF-guidance to URSP, and transmit, to the AC 102, an edge computing (EC) guidance notification message including an "indication indicating that EC is available," and an indication indicating whether the current DNN configured in the AC 102 is available as a traffic descriptor (e.g., a notification to indicate that DNN configured in AC should not be used as traffic descriptor). In an embodiment, the EC guidance notification message may inform the AC 102 that the URSP rules are valid. In an embodiment, after completion of an EAS discovery procedure using the EDN configuration information received from the ECS 108, the EEC 103 may transmit EAS information obtained through the EAS discovery procedure in an the EC guidance notification message to the AC 102.

Figure 5:
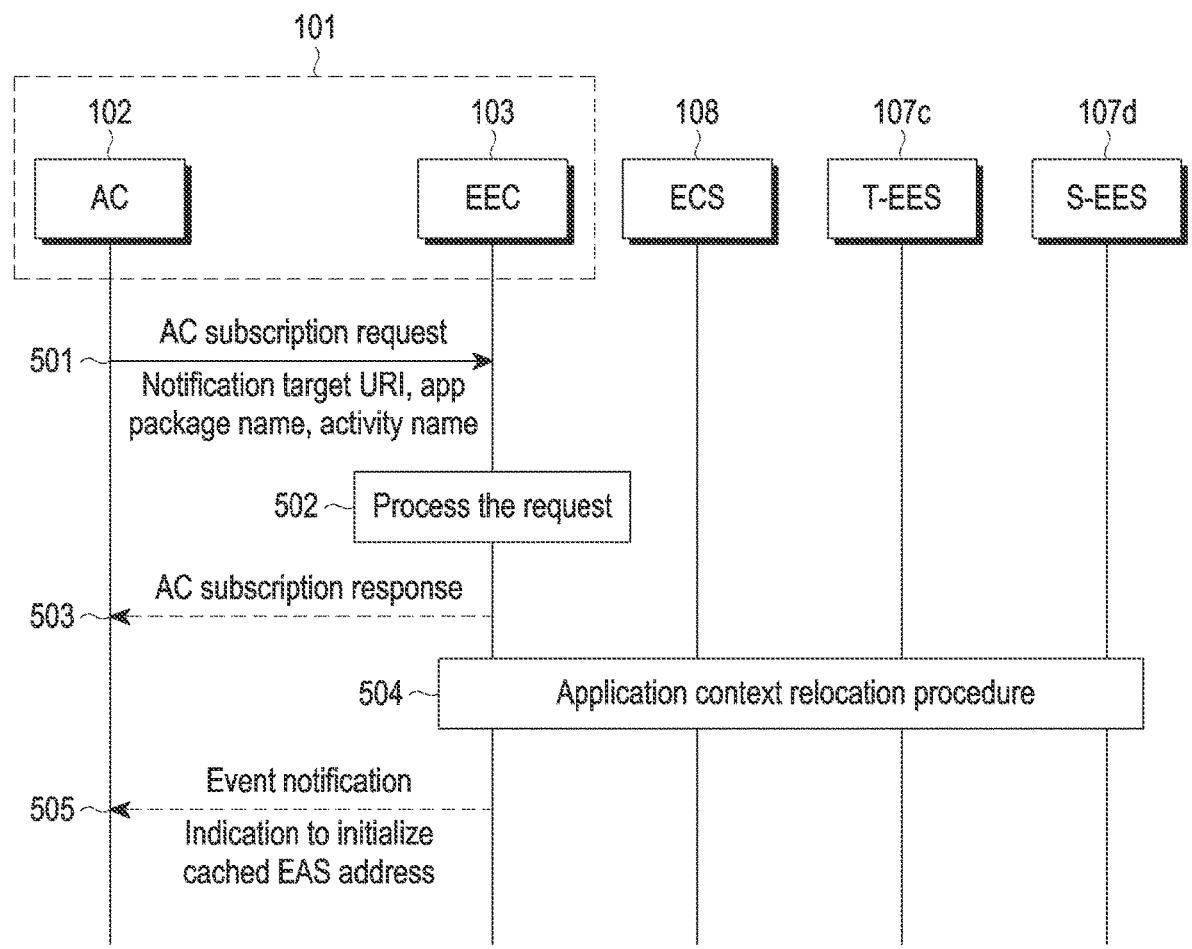
FIG. 5 is a diagram illustrating a signal flow for a procedure of obtaining AC information and providing a notification service according to an embodiment of the disclosure.

FIG. 5 is a diagram illustrating a signal flow for a procedure of obtaining AC information and providing a notification service according to an embodiment of the disclosure.

Referring to FIG. 5, in operation 501, an AC 102 may transmit an AC subscription request message (or an AC information subscription request message) to an EEC 103. In an embodiment, the AC subscription request message may be transmitted, when the installation of the AC 102 is completed, and a storage location (internal memory of the UE 101 or an external storage device (e.g., a shared storage space) of information (e.g., an AC profile) about the AC 102 is determined. In an embodiment, the AC subscription request message may include at least one piece of the following information.

A notification target address: an address at which the AC 102 will receive a notification message from the EEC 103.

Call information (e.g., an application package name/id) that may be used for another application or device (e.g., EEC 103) within the UE 101 to call the AC 102.

Information (e.g., an operation ID or an activity name) required to induce a specific operation of the AC 102: information that the EEC 103 uses to call the AC 102 to induce the specific operation, when needed. The operation ID/activity name may be used to request the AC 102 to induce the specific operation (e.g., "initialization of the cached server address") through the OS of the UE 101.

A mobility-related event ID: it may indicate at least one of "change of target EAS," "target EAS discovery for ACR (application context relocation)," or "ACR event."

In operation 502, the EEC 103 may store the information included in the AC registration request message received from the AC 102 as subscription information. In an embodiment, the EEC 103 may transmit a subscription request message (e.g., an EAS discovery subscription request message or an ACR information subscription request message) for a required notification server according to the mobility-related event ID to an EES (e.g., a source EES 107d).

In an embodiment, when the EEC 103 receives a "change of target EAS" event ID from the AC 102, the EEC 103 may transmit an event ID set to "EAS availability change" and EAS discovery filters in an EAS discovery subscription request message to the EES 107d. In an embodiment, when the EEC 103 receives an event ID set to "ACR event" from the AC 102, the EEC 103 may transmit an even ID set to "ACR complete" in an ACR information subscription request message to the EES 107d. In an embodiment, when the EEC 103 receives an event ID set to "target EAS discovery for ACR" from the AC 102, the EEC 103 may transmit an event ID set to "target information notification" in the ACR information subscription request message to the EES 107d.

In operation 503, the EEC 103 may transmit an AC subscription response message to the AC subscription request message received from the AC 102 to the AC 102. The AC subscription response message may include information indicating whether the EEC 103 is capable of detecting and providing an event that the AC 102 wants to be notified of.

In operation 504, the EEC 103 may perform an application context relocation (ACR) procedure to maintain service continuity according to movement of the UE 101. The ACR procedure may include a procedure of reallocating an EEC context from a source EES 107d to a target EES 107c according to a determination in the EEC 103. The EEC 103 may identify information about a target EAS (not shown) to which the AC 102 is to be connected and a result of the application context reassignment procedure (whether the ACR procedure has successfully been performed), while performing the ACR procedure.

In operation 505, the EEC 103 may identify the result of the ACR procedure, and provide an event notification message including an ACR result indication indicating the execution result and target EAS information to the AC 120. In an embodiment, when the EEC 103 fails in detecting a new target EAS or identifies that the ACR procedure is not successful, and recognizes that the AC 102 uses its own cache in operation 501, the EEC 103 may transmit the ACR result indication indicating failure of the ACR procedure and an "indication to initialize a cached EAS address" to the AC 102.

Figure 6:
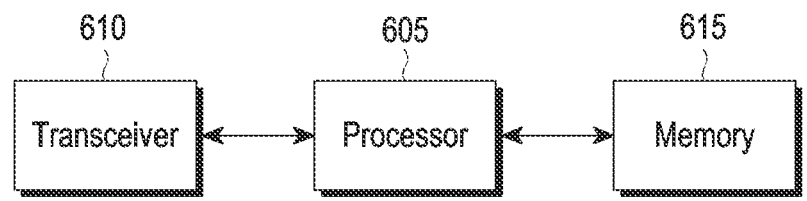
FIG. 6 is a block diagram illustrating the configuration of a user equipment (UE) according to an embodiment of the disclosure.

FIG. 6 is a block diagram illustrating the configuration of a UE according to an embodiment of the disclosure.

Referring to FIG. 6, a UE (e.g., a UE 101) may be implemented to include a processor 605 capable of performing wireless communication according to a communication method determined in a wireless communication system supporting edge computing according to the above-described embodiments, a transceiver 610, and memory 615. In an embodiment, the processor 605, the transceiver 610, and the memory 615 may be implemented in the form of at least one chip.

The processor 605 may control the operation of the transceiver 610, and provide overall control to the components of the UE 101 to provide AC information and receive edge computing service-related configuration information from the ECS 108 and the EES 107, using a program (e.g., the AC 102 and the EEC 103) installed and/or stored in the memory 615 according to each of the embodiments of FIGS. 1 to 5 and a combination of at least two of the embodiments.

Figure 7:
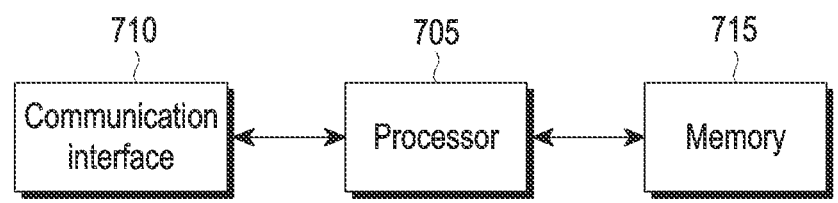
FIG. 7 is a block diagram illustrating the configuration of a network entity according to an embodiment of the disclosure.

FIG. 7 is a block diagram illustrating the configuration of a network entity according to an embodiment of the disclosure. The illustrated network entity may be, for example, at least one of the EAS, the EES, the ECS, or each component of the CN described with reference to FIGS. 1 to 5. Further, the network entity may be implemented, for example, in the form of a server.

Referring to FIG. 7, a network entity may be implemented to include a processor 705 capable of performing wired/wireless communication according to a communication method determined in a wireless communication system supporting edge computing, a communication interface 710, and memory 715.

The processor 705 may control the operation of the communication interface 710, and provide overall control to the components of the network entity to obtain AC information and allow the UE 101 to receive edge computing service-related configuration information, using a program (e.g., the EAS, the EES, the ECS, or functions of each component of the CN described before with reference to FIGS. 1 to 5) installed and/or stored in the memory 615 according to each of the embodiments of FIGS. 1 to 5 and a combination of at least two of the embodiments.

According to an embodiment, a communication method performed by an EEC of a UE in a wireless communication system supporting edge computing may include receiving, from an AC executed in the UE, an AC registration request message including an AC profile, an ECS address, and user consent on whether to allow external exposure of the AC profile (operation 201), selecting an ECS for performing service provisioning, based on the AC registration request message (operation 202-1), performing a service provisioning procedure for the selected ECS (operation 203), performing EEC registration and edge EAS discovery for an EES obtained through the service provisioning procedure (operation 204), and transmitting EAS information obtained from the EES through the EAS discovery to the AC (operation 205).

According to an embodiment, selecting the ECS may include, in the absence of an ECS address configured in the EEC or an ECS address provided from a core network, selecting the ECS using the ECS address included in the AC registration request message, and in the presence of the ECS address configured in the EEC or the ECS address provided from the core network, selecting the ECS preferentially using the ECS address included in the AC registration request message.

According to an embodiment, performing the service provisioning procedure may include, when the user consent included in the AC registration request message indicates that external exposure of the AC profile is allowed, transmitting a service provisioning request message including the AC profile to the selected ECS.

According to an embodiment, the AC registration request message may include an application package name usable for the EEC to call the AC, and an operation ID required to induce the AC to perform obtaining the user consent on whether to allow external exposure of the AC profile.

According to an embodiment, when a plurality of EASs are discovered through the EAS discovery, the AC registration request message may include an EAS selection request delegation indicator indicating whether to notify the AC of all of the plurality of discovered EASs or at least one EAS selected from among the plurality of discovered EAS s.

According to an embodiment, a communication method performed by an EEC of a UE in a wireless communication system supporting edge computing may include receiving, from an AC executed in the UE, an AC registration request message including a storage address of AC-related information (operation 301), obtaining the AC-related information from the storage address, wherein the AC-related information includes an AC profile, an ECS address, and user consent on whether to allow external exposure of the AC profile (operation 302), selecting an ECS for performing service provisioning, based on the AC registration request message (operation 303-1), performing a service provisioning procedure for the selected ECS (operation 304), performing EEC registration and edge application server (EAS) discovery for an edge enabler server (EES) obtained through the service provisioning procedure (operation 305), and transmitting EAS information obtained from the EES through the EAS discovery to the AC (operation 306).

According to an embodiment, the AC-related information may include an application package name usable for the EEC to call the AC, and an operation ID required to induce the AC to perform obtaining the user consent on whether to allow external exposure of the AC profile.

According to an embodiment, when a plurality of EASs are discovered through the EAS discovery, the AC registration request message may include an EAS selection request delegation indicator indicating whether to notify the AC of all of the plurality of discovered EASs or at least one EAS selected from among the plurality of discovered EAS s.

According to an embodiment, a communication method performed by an EEC of a UE in a wireless communication system supporting edge computing may include receiving, from an AC executed in the UE, an AC registration request message including a DNN, a PLMN ID, traffic descriptor information, and a DNN replacement allowance indicator (operation 401), transmitting a service provisioning request message including the DNN, the traffic descriptor information, and a URSP guidance execution indication to an ECS based on the AC registration request message (operation 403), receiving a service provisioning response message including a URSP result from the ECS in response to the service provisioning request message (operation 407), and transmitting, to the AC, an indication indicating that an edge computing service is available, and an indication indicating whether a DNN configured in the AC is available as a traffic descriptor, in response to the reception of the service provisioning response message (operation 408).

According to an embodiment, a communication method performed by an EEC of a UE in a wireless communication system supporting edge computing may include receiving, from an AC executed in the UE, an address at which the AC is to receive a notification message, an application package name of the AC, an operation ID required to induce a specific operation of the AC, and an indication indicating a change of a target EAS (operation 501), transmitting a subscription request message to a source EES in response to the indication indicating the change of the target EAS (operation 502), transmitting an AC subscription response message corresponding to the AC subscription request message to the AC (operation 503), performing an application context reallocation procedure for maintaining service continuity according to movement of the UE from the source EES to a target EES (operation 504), and transmitting an indication indicating a result of the application context reassignment procedure, and target EAS information to the AC (operation 505).

According to an embodiment, the ECC of the UE may be configured to perform at least one or a combination of methods according to embodiments of the disclosure.

According to an embodiment, the ECS may be configured to perform at least one or a combination of methods according to embodiments of the disclosure.

While the disclosure has been described in the context of an edge computing server (e.g., an EES or an ECS), all application servers capable of interworking with a 3GPP network system may fall within the application scope of various embodiments of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A communication method performed by a user equipment (UE) in a wireless communication system supporting edge computing, the communication method comprising:
   transmitting, by an application client (AC) of the UE, an AC registration request message for an AC registration request, the AC registration request message including an AC profile, an edge configuration server (ECS) address, and an ECS provider ID to an edge enabler client (EEC) of the UE;
   and
   transmitting, by the EEC, an AC registration response message corresponding to the AC registration request message to the AC,
   wherein the AC registration response message comprises information indicating the AC registration request is successful.

2. The communication method of claim 1, further comprising:
   selecting an ECS using the ECS address included in the AC registration request message in response to an absence of a ECS address pre-configured in the EEC or a ECS address provided by a core network.

3. The communication method of claim 1, further comprising:
   transmitting, by the AC, a service provisioning request message including the AC profile to an ECS in response to an user consent included in the AC registration request message indicating that external exposure of the AC profile is allowed.

4. The communication method of claim 1, wherein the AC registration request message includes:
   an application package name usable for the EEC to call the AC; and
   an operation identifier required to induce the AC to perform obtaining an user consent on whether to allow external exposure of the AC profile.

5. The communication method of claim 1, wherein the AC registration request message includes:
   an EAS selection request delegation indicator indicating whether to notify the AC of all of a plurality of discovered EASs, or at least one EAS selected from among the plurality of discovered EASs.

6. The communication method of claim 1, further comprises:
   selecting an ECS preferentially using the ECS address included in the AC registration request message in response to an absence of a ECS address pre-configured in the EEC or a ECS address provided by a core network.

7. A communication method performed by an edge enabler client (EEC) of a user equipment (UE) in a wireless communication system supporting edge computing, the communication method comprising:
   receiving, from an application client (AC) executed in the UE, an AC registration request message including a data network name (DNN), a public land mobile network (PLMN) identifier (ID), traffic descriptor information, and a DNN replacement allowance indicator;
   transmitting a service provisioning request message including the DNN, the traffic descriptor information, and a UE route selection policy (URSP) guidance execution indication to an edge configuration server (ECS) based on the AC registration request message;
   receiving a service provisioning response message including a URSP result from the ECS in response to the service provisioning request message; and
   transmitting, to the AC, an indication indicating that an edge computing service is available, and an indication indicating whether a DNN configured in the AC is available as a traffic descriptor, in response to the reception of the service provisioning response message.

8. A user equipment (UE) in a wireless communication system supporting edge computing, the UE comprising:
   a transceiver; and
   a processor including an edge enabler client (EEC),
   wherein the processor is configured to:
      transmit, by an application client (AC) of the UE, an AC registration request message for an AC registration request, the AC registration request message including an AC profile, an edge configuration server (ECS) address, and an ECS provider ID to an edge enabler client (EEC) of the UE,
   and
   transmit, by the EEC, an AC registration response message corresponding to the AC registration request message to the AC,
   wherein the AC registration response message comprises information indicating the AC registration request is successful.

9. The UE of claim 8, wherein the processor is further configured to:
   select an ECS using the ECS address included in the AC registration request message in response to an absence of a ECS address pre-configured in the EEC or a ECS address provided by a core network.

10. The UE of claim 8, wherein the processor is further configured to, transmit, by the AC, a service provisioning request message including the AC profile to an ECS in response to an user consent included in the AC registration request message indicating that external exposure of the AC profile is allowed.

11. The UE of claim 8, wherein the AC registration request message includes:
   an application package name usable for the EEC to call the AC, and
   an operation identifier required to induce the AC to perform obtaining an user consent on whether to allow external exposure of the AC profile.

12. The UE of claim 8, wherein the AC registration request message includes:
   an EAS selection request delegation indicator indicating whether to notify the AC of all of a plurality of discovered EASs, or at least one EAS selected from among the plurality of discovered EASs.

13. The UE of claim 8, wherein the processor is further configured to:
   select an ECS preferentially using the ECS address included in the AC registration request in response to an absence of a ECS address pre-configured in the EEC or a ECS address provided by a core network.

14. An user equipment (UE) in a wireless communication system supporting edge computing, the UE comprising:
   a transceiver; and
   a processor including an edge enabler client (EEC),
   wherein the processor is configured to:
      receive, from an application client (AC) executed in the UE, an AC registration request message including a data network name (DNN), a public land mobile network (PLMN) identifier (ID), traffic descriptor information, and a DNN replacement allowance indicator, transmit a service provisioning request message including the DNN, the traffic descriptor information, and a UE route selection policy (URSP) guidance execution indication to an edge configuration server (ECS) based on the AC registration request message, receive a service provisioning response message including a URSP result from the ECS in response to the service provisioning request message, and transmit, to the AC, an indication indicating that an edge computing service is available, and an indication indicating whether a DNN configured in the AC is available as a traffic descriptor, in response to the reception of the service provisioning response message.

* * * * *